Patented Jan. 16, 1923.

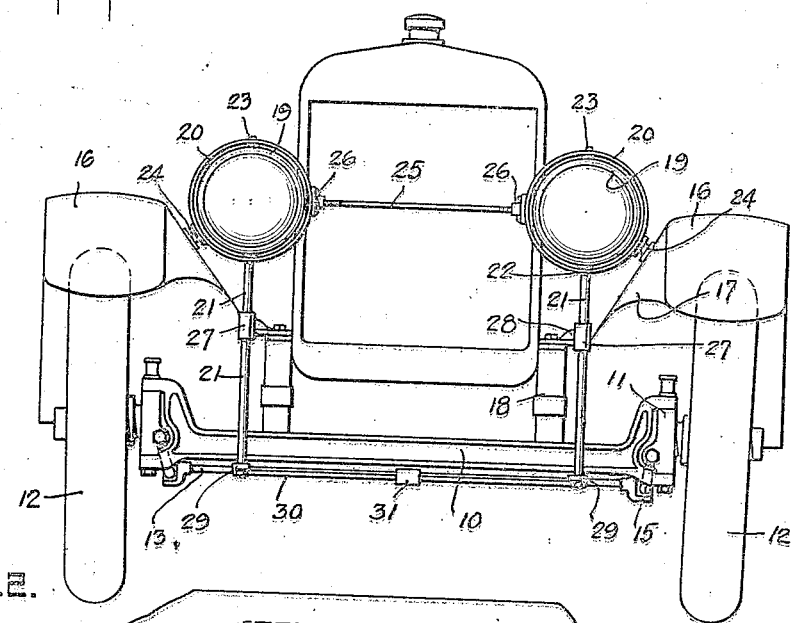
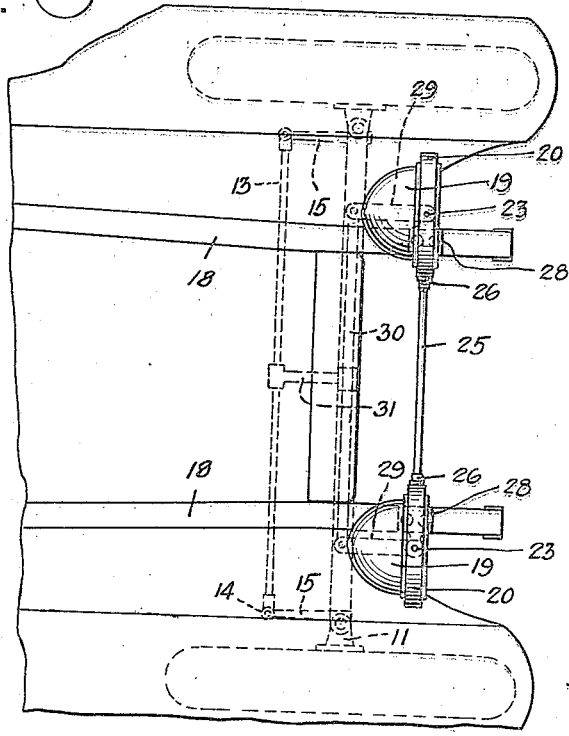

1,442,604

UNITED STATES PATENT OFFICE.

GEORGE W. J. CRABB, OF EAST ORANGE, NEW JERSEY.

DIRIGIBLE LAMP.

Application filed April 17, 1922. Serial No. 553,735.

*To all whom it may concern:*

Be it known that I, GEORGE W. J. CRABB, a citizen of the United States, residing at East Orange, in the county of Essex and State of New Jersey, have invented certain new and useful Improvements in Dirigible Lamps, of which the following is a specification.

This invention relates to road vehicles and has particular reference to automobiles or the like adapted to be operated by power and intended for operation for all kinds of roadways.

Among the objects of the invention is to provide a lamp or pair of lamps for a self-propelled vehicle so arranged or constructed that the light from the lamp or lamps will be directed forward so as to illuminate the roadway at all times directly in front of the vehicle whether the vehicle is moving directly forward or making a lateral turn in either direction. It is well understood that with automobile lights constructed and mounted as usual on the frame of the automobile the light from the lamps is not thrown in the direction most advantageous at the time the vehicle is being steered or about to be steered laterally, and thereby the light fails to be thrown upon the roadway at the most critical time or place, it being borne in mind that the greatest need for the light is at such a time as a turn is either being made or contemplated, as when meeting or passing any vehicle or steering around a chuck hole or other obstacle.

By this invention therefore I provide in a very simple and effective manner for the steering laterally of the light or beams of light in the same direction and to an extent corresponding to the lateral steering of the wheels of the machine, the steering of the beams of light being effected coincident with the usual steering mechanism of the machine and hence without special care or attention on the part of the driver.

With the foregoing and other objects in view but without restricting the scope of the invention unnecessarily to the specific form of devices illustrated and described herein except as may be required by the scope of the claim, the invention will be noted in detail from the following specific description in connection with the accompanying drawings, in which Figure 1 is a front elevation of an automobile showing my improvement attached thereto.

Fig. 2 is a plan view of the same.

Referring now more specifically to the drawings I show as the basis for the specific improved mechanism a conventional machine comprising a front axle 10, steering knuckles 11, wheels 12, and a radius bar 13 connected pivotally in the usual manner at 14 to the rear ends of the arms 15 of the steering knuckles. It will of course be understood that the steering mechanism, not shown, for the machine will be attached to this bar 13. I also indicate mud guards 16 for the front wheels, the same including inner walls or shells 17 leading downward and inward toward the chassis 18.

In this improvement each lamp comprises a casing 19 mounted movably within an annulus or ring shaped frame 20. An axis rod 21 is connected to the bottom of the lamp casing 19 and is journaled in the bottom portion of the annulus 20 where it is provided with a shoulder 22 for supporting the lamp casing and axis rod in such position that the lamp casing is centered in the annulus where it is movable around a vertical axis, the said axis rod and upper portion of the lamp casing being fitted with a trunnion 23 in alignment with the rod 21 and journaled in the upper portion of the annulus. The annulus is rigid and may be secured to any convenient adjacent part of the machine such as the shell 17, through a bracket 24. This description of each lamp and its annulus is applicable to the other lamp and its annulus, and between the two lamps is extended a tie rod 25 of a length agreeable to the type of machine and the space between the two annuluses to which the ends of the rod are secured through right and left threads fitted in the hubs 26 secured to the inner sides of the annuluses. Hence the tie rod serves not only as a stiffener or tie rod for the frames but also as a means for the attachment of the license plate or the like.

27 indicates a bearing formed preferably integral with the rigid part of the bracket 28 suitably designed according to the type of machine to which it is to be attached, as to the adjacent frame 18, the point of attachment being according to the selected position for the rod 21 journaled in the bearing 27 and along which the rod and bearing have relatively free movement to compensate for downward vibration of the vehicle frame and body with respect to the axle. To the lower end of each rod 21 is rigidly attached an arm 29 extending parallel to and of equal length with the arm 15 of the steering device. A rod 30 parallel to the radius bar 13 is pivotally attached to the rear ends of the arms 29, and a link 31 extends between the rods 13 and 30 tying them together in such a manner that they will always move as a unit. It follows therefore that when the steering mechanism is operated and the radius bar 13 is moved laterally its ends move around the vertical axes of the steering knuckles, and the bar 30 and arms 29 will be similarly moved around the axes of the axis rods 21. If therefore the wheels be steered for a right turn the lamp casings will be moved simultaneously therewith in the same direction, and the light beams will be thrown forward in a direction substantially the same as the direction or position of the wheels.

I claim:

The combination with the front steering wheels of an automobile including steering knuckles having projecting arms and a radius bar pivotally connected to the ends of said arms and mud guards disposed over said steering wheels, said mud guards having inner walls leading downward and inward, of a pair of headlights each comprising a casing and a frame rigidly attached to the adjacent inner wall, an axis rod journaled in each frame and connected to the adjacent casing and around the vertical axis of which axis rod the casing is movable, a horizontal tie rod having right and left threaded end connections with said frames, an arm connected to the axis rod of each headlight casing and extending from said axis rod in the direction corresponding to the adjacent steering knuckle arm, a second rod having its ends pivoted to the otherwise free ends of the headlight axis rod arms, a shoulder and a trunnion on each axis rod adjacent to its casing for supporting the casing and maintaining the casing centrally disposed with respect to the frame, and means to connect said second rod to the aforesaid radius bar to compel the rod and bar to operate as a unit.

In testimony whereof I affix my signature.

GEORGE W. J. CRABB.